Feb. 8, 1938. H. NUTT ET AL 2,107,739
CLUTCH
Filed Nov. 1, 1934 4 Sheets-Sheet 2

Inventors
Harold Nutt.
Harold V. Reed.
by Charles H. Hills Attys.

Feb. 8, 1938.                H. NUTT ET AL                2,107,739
                                CLUTCH
                         Filed Nov. 1, 1934          4 Sheets-Sheet 4

Inventors
Harold Nutt.
Harold V. Reed.

Patented Feb. 8, 1938

2,107,739

UNITED STATES PATENT OFFICE 2,107,739

CLUTCH

Harold Nutt and Harold V. Reed, Chicago, Ill., assignors, by mesne assignments, to Borg-Warner Corporation, Chicago, Ill., a corporation of Illinois Application November 1, 1934, Serial No. 750,959

5 Claims. (Cl. 192—103)

This invention relates to automotive clutches of the normal spring engaged type wherein the engaging pressure is increasingly supplemented by centrifugally responsive means at rotative speeds above that at which such a clutch is normally manually disengaged.

It is an object of this invention to provide a clutch of the class described wherein a constant engaging force is supplemented by a variable centrifugal engaging force of such magnitude that the resultant total force may be substantially reduced to enable easier clutch disengagement at low rotative speeds, while the variable force builds up at higher speeds to give the required higher total pressure to compensate for a decrease in the coefficient of friction at higher slip speeds. A normal manually disengageable clutch for automotive service must have a much heavier engaging pressure than that required to transmit the maximum engine torque, which occurs at relatively low rotative speeds, for the reason that the coefficient of friction of the clutch facings or friction material decreases with an increase in the slip speed; which varies with the engine speed when picking up a stationary load. Thus while the engine torque falls off with increase in rotative speed the clutch pressure must be substantially increased to carry the reduced torque at high speeds because the reduced coefficient of friction more than offsets the reduction in engine torque. The present invention permits the clutch to be designed with a substantially reduced total pressure adequate for maximum engine torque which occurs at about 1200 R. P. M., the centrifugal force added to the constant pressure being of small amount at such a speed while building up at higher speeds to provide additional pressure to compensate for the reduced coefficient of friction at such higher speeds. If the centrifugal pressure is held to a small part of the total pressure at normal engaging speeds its increase at higher speeds will not be so excessive as to make it very difficult to disengage the clutch at such higher speeds.

It is also an object of this invention to provide an improved clutch of the class described wherein the manual effort required to disengage the clutch at normal operating speeds is substantially reduced, while the ability of the clutch to pick up its load at higher speeds has been retained unaffected.

It is another object of this invention to provide an improved manually controlled clutch of the class described that can be economically manufactured and adjusted to compensate for wear of the friction materials.

Other and further important objects of this invention will be apparent from the disclosures in the specification and the accompanying drawings.

This invention (in a preferred form) is illustrated in the drawings and hereinafter more fully described.

Figure 1:
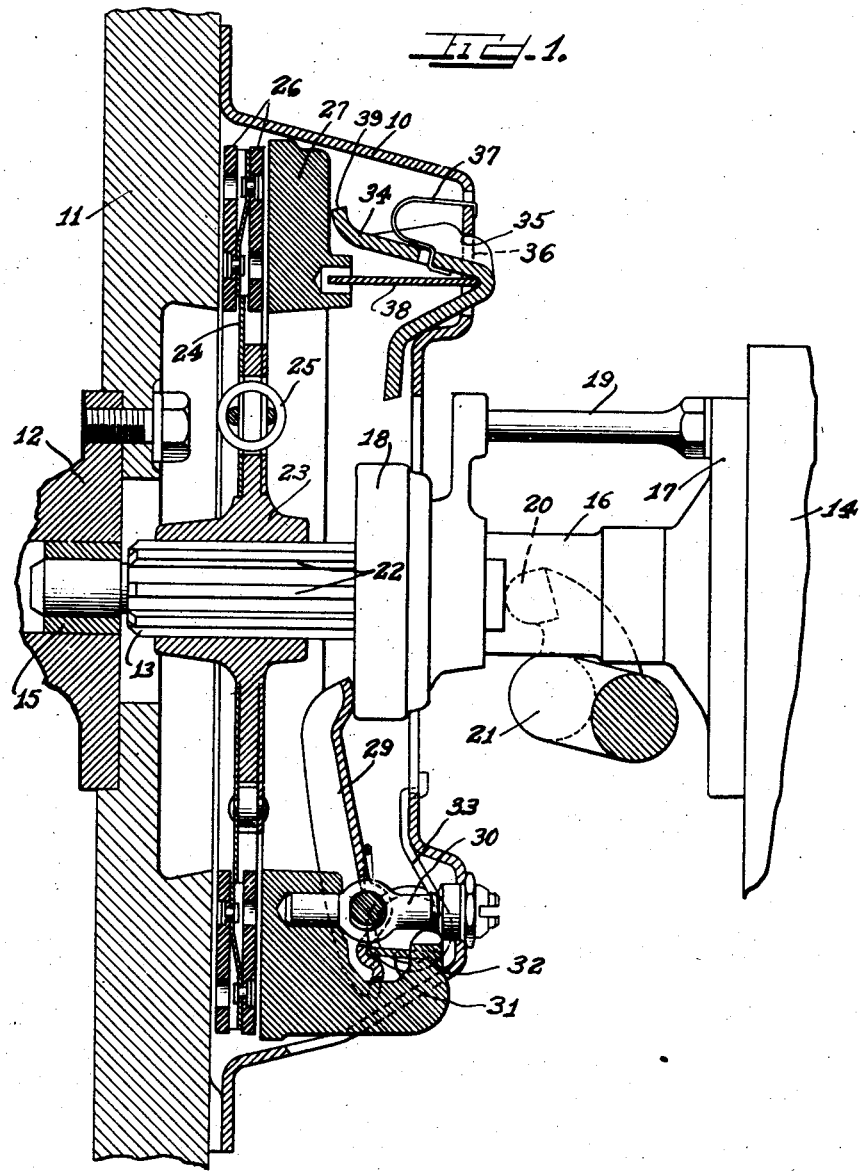
Figure 1 is an axial vertical section through a clutch embodying the features of this invention, the section corresponding to the line I—I of Figure 3 and showing the clutch in its disengaged position with the various running clearances exaggerated for clearness.

Aside from the centrifugally energized mechanism, to be described hereinafter, the clutch chosen for illustrative purposes is of a conventional design embodying a housing 10 applied to the rear face of a flywheel 11 attached to an engine crankshaft 12. A clutch driven shaft 13, which forms the driving shaft of a transmission 14, has a pilot bearing 15 in the crankshaft, and is journaled in a sleeve 16 having a flanged end 17 secured to the transmission case, the sleeve being provided to carry a throwout thrust bearing 18 held against rotation by a stud 19 projecting from the transmission case. The throwout bearing 18 can be manually advanced to the left by means of a throwout fork 20 carried by a shaft 21 operated by the usual clutch pedal (not shown).

Figure 2:
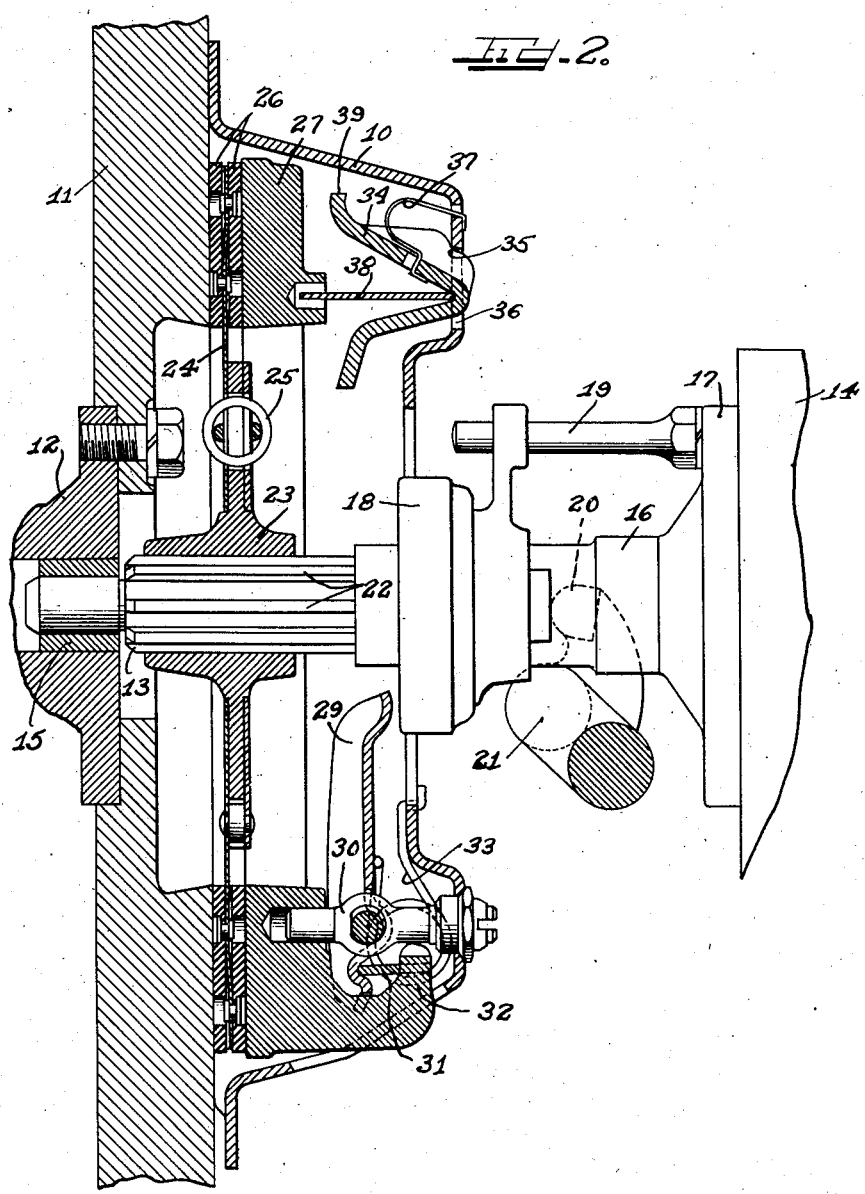
Figure 2 is a section similar to Figure 1 showing the clutch in its engaged position.
Figure 3:
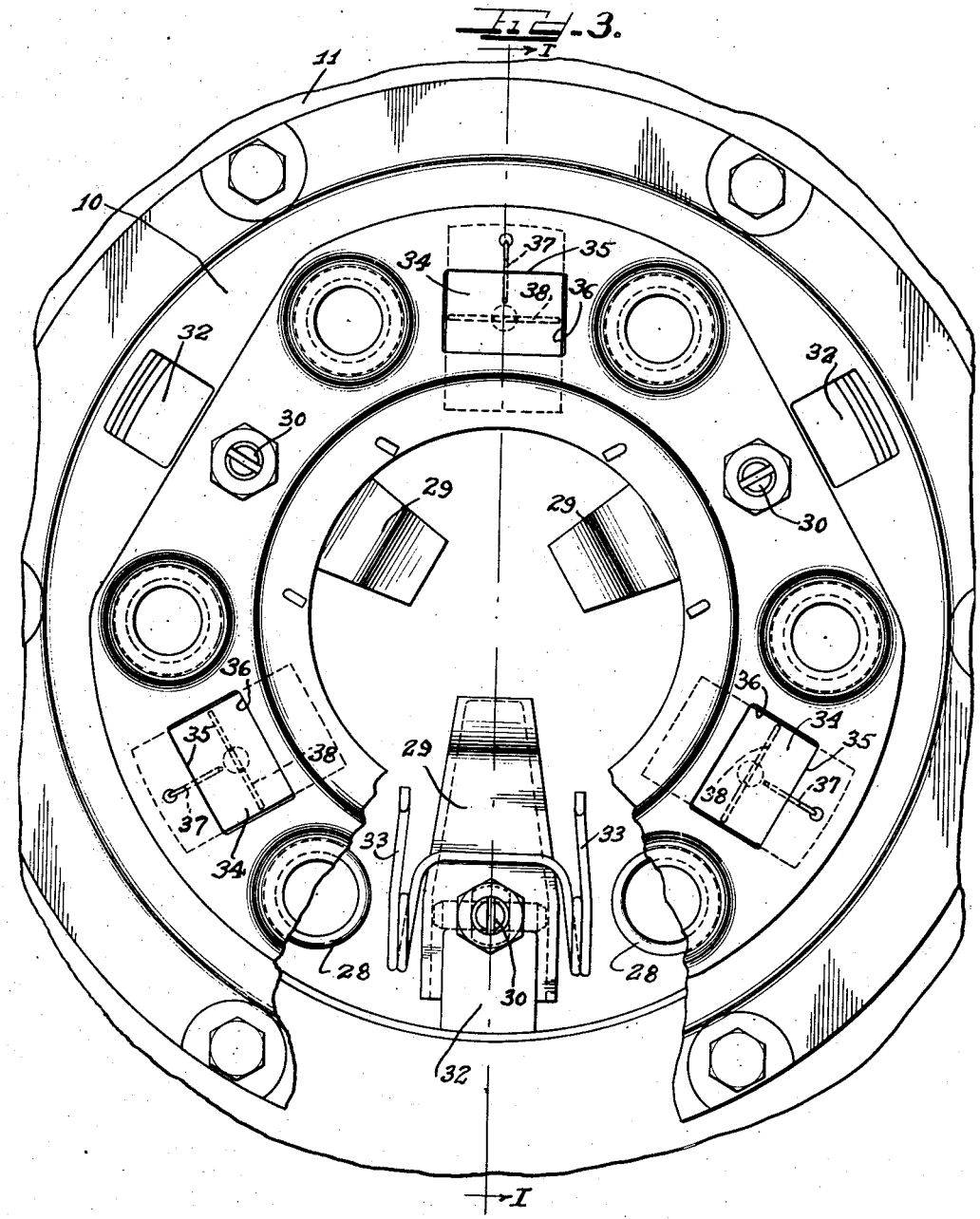
Figure 3 is a rear view of the housing, partly broken away to show one of the throwout levers; the driven members having been omitted for the sake of clearness.

The driven shaft 13 is splined at 22 to carry a longitudinally shiftable hub 23 to which is applied a driven disc 24 having a torsional connection thereto including springs 25. The driven disc carries friction facing material 26 and is distorted to soften the clutch engagement. A pressure plate 27 is backed by preloaded springs 28 seated against the housing 10, the springs forcing the pressure plate to clamp the driven disc against the flywheel as shown in Figure 2. In a normal manually disengaged clutch these springs would be preloaded to provide a total engaging pressure sufficient to control the desired engine torque at any possible engaging speed and would therefore exceed the pressure required to carry the maximum torque of the same engine at normal clutching speeds. The present invention permits the reduction of this spring load for a given clutch capacity and therefore reduces the force required to manually disengage the clutch at normal speeds.

Throwout levers 29 are provided which are pivoted to adjustable studs 30 carried by the housing 10 and engaging, by means of links 31, under-lips 32 formed on the pressure plate 27. The arrangement of the levers 29 is such that movement of the throwout bearing to the left pivots the levers counterclockwise to retract the pressure plate, the leverage being so arranged as to multiply the force to an extent to bring the pedal pressure well within the capacity of an average driver. A torsion type of spring 33 is engaged between the lever and housing to take up any lost motion in the mechanism.

In order to supplement the fixed spring load at high slip speeds, under which conditions the coefficient of friction of the friction facings is greatly reduced, we have provided centrifugally responsive weights 34 arranged to increase the total clutch pressure at high rotative speeds. These weights are preferably metal stampings shaped to provide fulcrum points 35 bearing against the edge of apertures 36 in the housing, the weights being held against the aperture edge by light springs 37. Centrifugal force acting on the weights tends to swing them clockwise and this force is transmitted to the pressure plate by struts or links 38. The upturned ends 39 of the weights are not intended to seat against the housing until the clutch has been worn in to a point making replacement of the friction facings advisable, so that the force developed by the weights is proportional to the square of the rotative speed and builds up as the speed increases to provide maximum pressure at high speeds.

Figure 4:
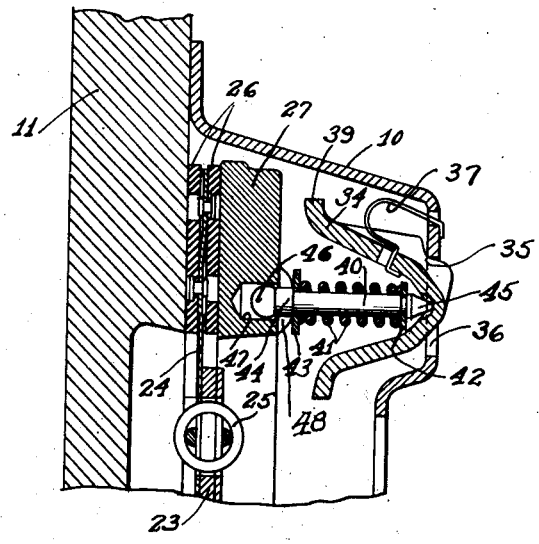
Figure 4 is a fragmentary section corresponding to the upper part of Figure 1 showing a modified form of this invention wherein the maximum centrifugal force is limited to a predetermined maximum; the clutch being shown in its preliminary engagement position wherein the centrifugal weights have not reached their extreme position.
Figure 5:
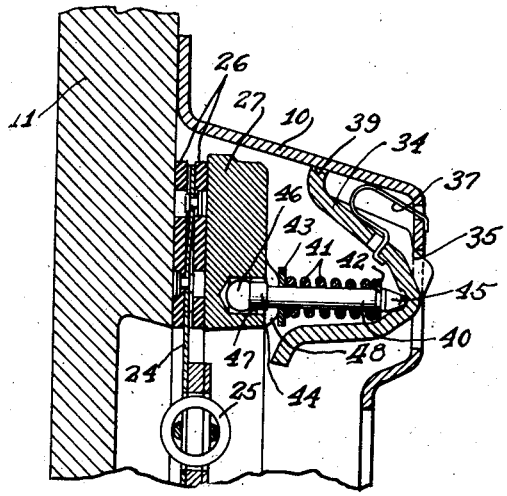
Figure 5 is a fragmentary section similar to Figure 4 wherein the centrifugal weights are shown in their extreme position.

The modification disclosed in Figures 4 and 5 limits the centrifugal force developed to a predetermined maximum and therefore prevents excessive pressures at high rotative speeds, providing a combination wherein the force required to disengage the clutch at normal or idling speeds is materially reduced while the maximum force required to disengage the clutch at higher speeds is limited to a predetermined value. In this modification a guide stud 40 replaces the link 38 previously described and a coiled spring 41 is provided which is compressed between collars 42 and 43 one of which is fixed on the stud and the other is slidable thereon but held against spring expansion by a shoulder 44 on the stud. One end of the stud 40 is provided with a knife edge rocker bearing 45 which engages the weight 34 and the other end of the stud is formed as a ball 46 guided in an aperture 47 in the pressure plate. The pressure on the stud developed by clockwise movement of the weight 34 is transmitted through the spring 41 to the collar 43 which rests on bosses 48 on either side of the guide aperture 47 in the pressure plate. Thus the stud and spring together act as a stiff strut up to a predetermined limit set by the preloading and rate of the spring 41 so that the spring limits the transmission of the high centrifugal forces developed at higher rotative speeds, and allows the weight end 39 to swing out into contact with the housing, as shown in Figure 5, thus providing a positive stop for the weight.

In the operation of the clutch of this invention the weights are so proportioned that the centrifugal clutch engaging forces generated thereby form only a minor proportion of the fixed spring load at normal clutch engaging speeds between 1000 and 1200 R. P. M. The spring load is proportioned to carry normal engine torque at such speeds and is therefore substantially less than in a normal clutch of the same rating, so that clutch disengagement at such normal speeds requires much less effort.

The total spring pressure in a conventional clutch must be sufficient to take care of the reduced coefficient of friction at high slip speeds, so that the clutch will have sufficient capacity to snub down the engine from high speed when the driver is attempting to pull out of deep snow, sand or mud, where a great amount of torque is required. If then, enough spring pressure is provided for the high speed slip, that amount of pressure is in excess of what is required at slow speed slip.

On the other hand, if a percentage of the total pressure plate load at 1000 R. P. M. is centrifugal pressure, and the speed of slip is increased to 3000 or 4000 R. P. M., the centrifugal pressure developed will be multiplied by nine or sixteen respectively. Obviously, this will greatly increase the torque capacity of the clutch at high speeds. The pedal pressure to operate the clutch will be increased correspondingly, but if the centrifugal effect at 1000 R. P. M. is a small percentage of the total clutch pressure, it will always be possible to release the clutch manually at any speed. Moreover the amount of pedal pressure is still further reduced when the engine is idling, making it possible to hold the clutch pedal in the released position with a minimum of effort. This is particularly helpful at stop lights. Since the usual engine speeds at which the clutch is released are below 3000 R. P. M., the increase in pedal pressure due to centrifugal force is not objectionable in ordinary car operation.

The modification of Figures 4 and 5 prevents the development of excessive centrifugal forces at high rotative speeds and thus limits the added pressure at such speeds to that required to handle the load at high slip speeds.

It will thus be seen that we have invented an improved and simplified semi-centrifugal clutch wherein manual disengagement is facilitated at normal engaging speeds by a reduction in the pedal pressure required at such speeds without rendering disengagement excessively difficult at the higher engine speeds.

We are aware that many changes may be made and numerous details of construction may be varied through a wide range without departing from the principles of this invention, and we therefore do not purpose limiting the patent granted hereon otherwise than necessitated by the prior art.

We claim as our invention:

1. In a centrifugally responsive clutch mechanism, a driving assembly including a housing having apertures arranged in annular array about the axis thereof and a pressure plate movable axially relative to the housing for engagement with a driven clutch disc, a plurality of weight members partially received within said apertures and adapted to fulcrum upon one edge of the apertures, said weight members being so arranged relative to the housing as to move upon their fulcrum points under the influence of centrifugal force when the driving assembly is rotated, relatively light springs associated with the housing and with the weight members urging said weight members in the direction assumed when said weight members are acting under the influence of centrifugal force, and thrust members interposed between the pressure plate and the weight members at one side of the fulcrums thereof.

2. The combination with a manually controllable clutch, including driving and driven members, a pressure plate adapted to engage said members, spring means acting against said pressure plate and providing a predetermined engaging pressure, and manually operable means for disengaging the clutch at will, of centrifugally energizable means arranged to supplement the spring means to increase the engaging pressure at high rotative speeds, said centrifugally energizable means including weight members each having a fulcrum point contacting with said driving member, thrust assemblies adapted to yield under a predetermined thrust interposed between said pressure plate and each of said weight members at one side of its fulcrum point, said thrust assemblies comprising rigid guide studs having movable contact with the weight members at one end and piloted in said pressure plate at the opposite end, and compression springs surrounding said studs and interposed between a portion of each stud and a portion of said pressure plate and relatively light springs urging said weight members about their fulcrum points radially outwardly of the driving member and against said thrust members.

3. A clutch of the character described, comprising a driving assembly including a housing, a pressure plate movable relative thereto and spring means imparting axial thrust to such pressure plate, a driven member normally engageable by said pressure plate under the force of such spring means, means for moving said pressure plate away from said driven member, a weight member having direct rocking contact with the housing, a structurally independent thrust member contacting said pressure plate and movably engaging said weight member, said weight member being so arranged relative to said housing and to said thrust member as to translate centrifugal force acting upon said weight member during revolution of the driving assembly into relative thrust between said pressure plate and said housing, and spring means urging the weight member in the direction assumed when the weight member is acting under centrifugal force, the last named spring means maintaining the weight member in movable contact with the housing and the thrust member and maintaining the thrust member in place between the weight member and the pressure plate.

4. The combination with a manually controllable clutch, including driving and driven members, a pressure plate adapted to engage said members, spring means acting against said pressure plate and providing a predetermined engaging pressure, and means for disengaging the clutch at will, of centrifugally energizable means arranged to supplement the spring means to increase the engaging pressure at high rotative speeds, said centrifugally energizable means including a weight member having a fulcrum point contacting with said driving member, a thrust assembly interposed between said pressure plate and each weight member at one side of the fulcrum point and adapted to yield under a predetermined thrust, said thrust assembly comprising a rigid stud having movable contact with the weight member and piloted at its opposite end in said pressure plate, and a compression spring surrounding the stud and interposed between a portion of the stud and a portion of said pressure plate and a relatively light spring urging said weight member about its fulcrum point radially outwardly of the driving member and against said stud.

5. In a centrifugally responsive clutch mechanism, a driving assembly including a housing having a fulcrum edge and a pressure plate movable axially relative to the housing for engagement with a driven clutch disc, a weight member unattached to said housing and adjusted to fulcrum upon said edge under the influence of centrifugal force when the driving assembly is rotated, a relatively light spring associated with the housing and with the weight member, urging said weight member in the direction assumed when said weight member is acting under the influence of centrifugal force, and a structurally independent thrust member interposed between the pressure plate and the weight member at one side of the fulcrum thereof and held in place therebetween under the influence of said relatively light spring acting on said weight member.

HAROLD NUTT.
HAROLD V. REED.